US011772670B2

(12) United States Patent
Bielby

(10) Patent No.: US 11,772,670 B2
(45) Date of Patent: Oct. 3, 2023

(54) CUSTOMIZED VEHICLE OPERATION BASED ON DRIVER STATUS

(71) Applicant: Micron Technology, Inc., Boise, ID (US)

(72) Inventor: Robert Richard Noel Bielby, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 356 days.

(21) Appl. No.: 16/892,137

(22) Filed: Jun. 3, 2020

(65) Prior Publication Data

US 2021/0380080 A1 Dec. 9, 2021

(51) Int. Cl.
*B60W 50/10* (2012.01)
*B60T 7/12* (2006.01)
*B60T 17/22* (2006.01)
*B60W 50/12* (2012.01)
*B60W 40/08* (2012.01)

(52) U.S. Cl.
CPC ............ *B60W 50/10* (2013.01); *B60T 7/12* (2013.01); *B60T 17/221* (2013.01); *B60W 40/08* (2013.01); *B60W 50/12* (2013.01); *B60T 2250/04* (2013.01); *B60W 2040/0818* (2013.01); *B60W 2540/229* (2020.02); *B60Y 2302/05* (2013.01); *B60Y 2302/07* (2013.01)

(58) Field of Classification Search
CPC ...... B60W 50/10; B60W 40/08; B60W 50/12; B60W 2040/0818; B60W 2540/229; B60T 7/12; B60T 17/221; B60T 2250/04; B60Y 2302/05; B60Y 2302/07
See application file for complete search history.

(56) References Cited

U.S. PATENT DOCUMENTS

| | | | | |
|---|---|---|---|---|
| 8,698,639 B2 * | 4/2014 | Fung | ...................... | B60T 8/172 |
| | | | | 340/576 |
| 9,296,382 B2 * | 3/2016 | Fung | ...................... | B60W 10/04 |
| 9,440,646 B2 * | 9/2016 | Fung | ...................... | B60W 40/09 |
| 9,505,402 B2 * | 11/2016 | Fung | ...................... | B60W 10/22 |
| 9,855,945 B2 * | 1/2018 | Fung | .................. | G01C 21/3697 |
| 11,377,094 B2 * | 7/2022 | Fung | ...................... | B60W 30/08 |
| 2012/0212353 A1 * | 8/2012 | Fung | ...................... | B60W 40/08 |
| | | | | 701/1 |
| 2016/0001781 A1 * | 1/2016 | Fung | ..................... | G06V 20/597 |
| | | | | 701/36 |
| 2017/0232973 A1 * | 8/2017 | Otake | .................. | B60W 50/10 |
| | | | | 701/43 |
| 2017/0297566 A1 * | 10/2017 | Matsumura | ........... | B60W 40/08 |

(Continued)

FOREIGN PATENT DOCUMENTS

| | | | | | |
|---|---|---|---|---|---|
| CN | 111434553 B | * | 12/2021 | ............ | B60W 40/08 |
| DE | 102020211989 A1 | * | 3/2022 | ............ | B60W 40/08 |
| KR | 20170142717 A | * | 12/2017 | ............ | B60W 40/08 |

*Primary Examiner* — Dale W Hilgendorf

(74) *Attorney, Agent, or Firm* — Greenberg Traurig

(57) ABSTRACT

Embodiments of the present disclosure relate to assisted driving of a vehicle. The response time of the driver may be measured and control operations may be adjusted to accommodate or compensate the response time of the driver. Predictive actions in anticipation of a slightly delayed input from the driver may be taken to avoid potentially dangerous conditions. A vehicle may be controlled to slow down to allow more time to a potential event to accommodate a slow response from the driver.

19 Claims, 7 Drawing Sheets

(56) References Cited

U.S. PATENT DOCUMENTS

| | | | | |
|---|---|---|---|---|
| 2018/0174457 | A1* | 6/2018 | Taylor | G08G 1/0962 |
| 2018/0268695 | A1* | 9/2018 | Agnew | B60K 28/066 |
| 2019/0202472 | A1* | 7/2019 | Lee | B60W 50/12 |
| 2019/0283764 | A1* | 9/2019 | Morimoto | G06V 20/597 |
| 2020/0262422 | A1* | 8/2020 | Kamiya | B60W 30/18159 |
| 2021/0016783 | A1* | 1/2021 | Watanabe | G06F 18/24 |
| 2021/0122366 | A1* | 4/2021 | Lee | B60W 30/09 |
| 2021/0312193 | A1* | 10/2021 | Alpert | G06V 20/597 |
| 2021/0370983 | A1* | 12/2021 | Oba | G08G 1/096844 |
| 2022/0126841 | A1* | 4/2022 | Kim | B60W 30/18163 |

* cited by examiner

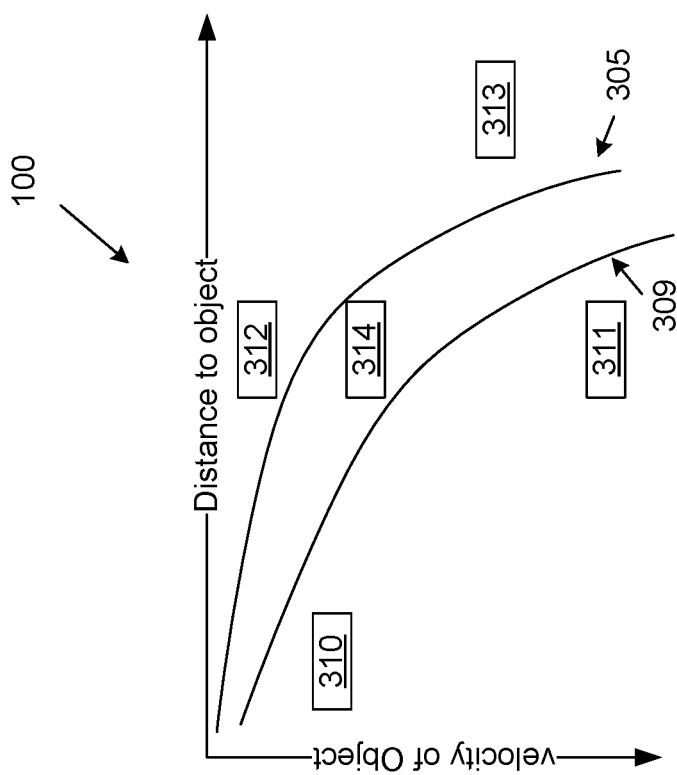
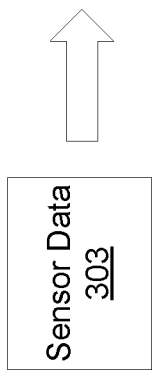
FIG. 3

CUSTOMIZED VEHICLE OPERATION BASED ON DRIVER STATUS

BACKGROUND

Drivers who are sleepy, tired, distracted, or otherwise impaired may have slow reaction times to road conditions. Such drivers may be slow to brake, swerve, or control the vehicle, thereby increasing the chance of an accident. Some vehicles include autonomous driving modes where the vehicle is controlled automatically with little to no driver involvement. However, such autonomous driving modes may require a user to manually enter an autonomous mode. In addition, autonomous modes are not known to accommodate a driver's mental state.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

FIG. 3 is a drawing of an example of detecting braking conditions in a vehicle operating environment according to various embodiments of the present disclosure.

DETAILED DESCRIPTION

Various embodiments of the present disclosure relate to assisted driving of a vehicle based on the driver's mental state. Depending on the driver's mental state, the driver may have a slower reaction than normal. The response time of the driver may be measured using a test system while the vehicle is not moving or may be measured through the normal course of driving. A vehicle's control operations may be adjusted to accommodate or compensate for the response time of the driver. Predictive actions in anticipation of a slightly delayed input from the driver may be taken to avoid potentially dangerous conditions. A vehicle may be automatically controlled to slow down in response to a potentially dangerous condition or otherwise adjusted to accommodate a slow response from the driver.

For example, a vehicle may be capable of driving autonomously. The vehicle may anticipate that the driver should take an action in response to a situation recognizable by the vehicle. If it is determined that the driver is slower to respond than expected, it may be inferred that the driver needs automated assistance. A driver's response time may be monitored by the vehicle based on the current driving by the driver. Alternatively, or in combination, it may be inferred from test systems that a driver has a slowed responsiveness. The vehicle may assist the driver by taking a leading action such as, for example, autonomously slowing down the vehicle to allow more time to avoid a road condition. Alternatively, or in combination, the vehicle may assist in adjusting parameters in the control system of the vehicle (e.g., the sensitivity of a braking action performed by the user). While the foregoing provides a high-level summary, the details of the various embodiments may be understood with respect to the figures.

Figure 1:
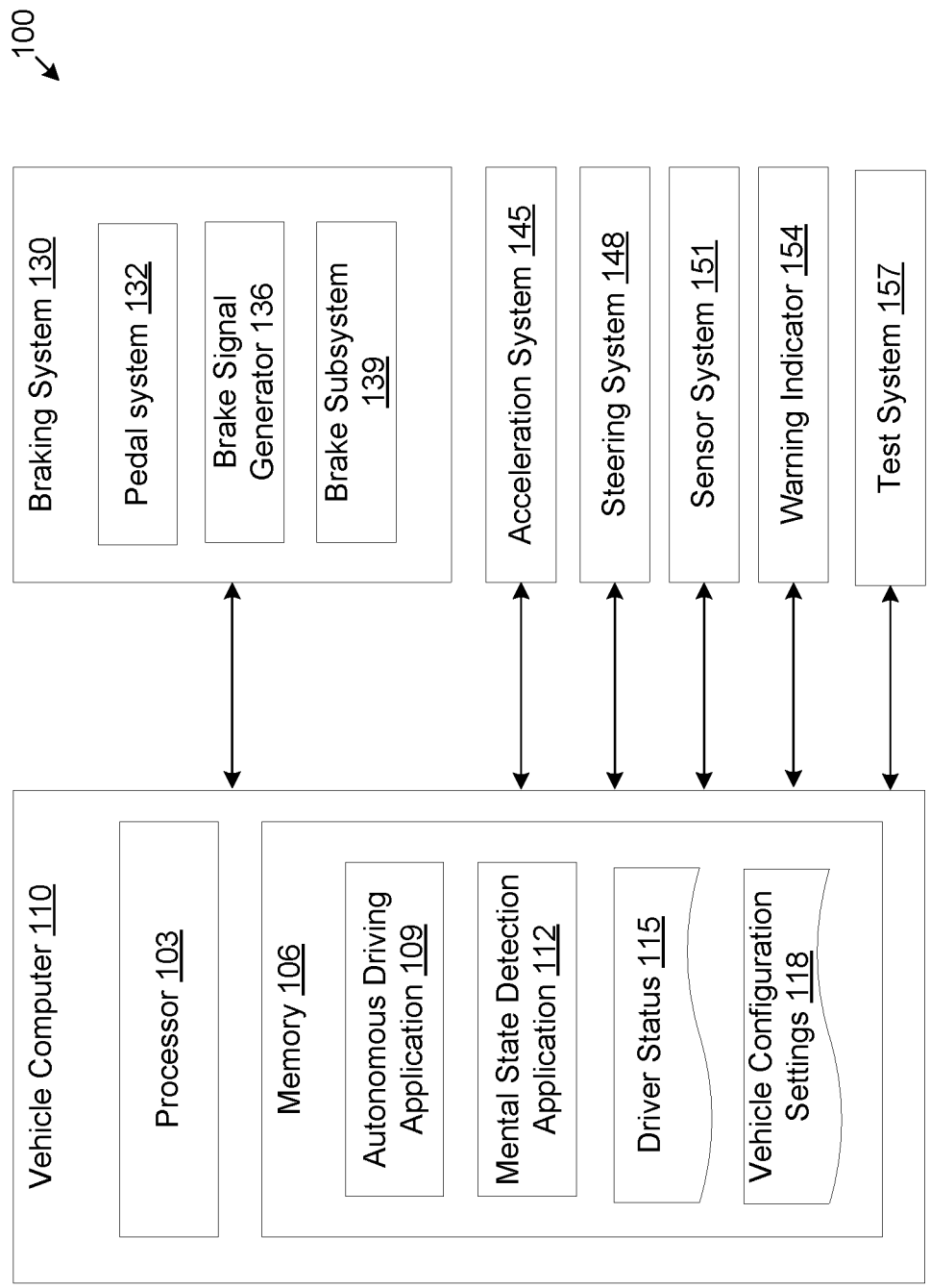
FIG. 1 is a drawing of a vehicle operating environment according to various embodiments of the present disclosure.

FIG. 1 shows a vehicle operating environment 100 according to various embodiments. The vehicle operating environment 100 may take place within a vehicle such as an automobile, motorcycle, truck, or other road-based vehicle. The vehicle accommodates a driver has the ability to drive the vehicle by steering, changing gears, accelerating, or decelerating the vehicle. The vehicle operating environment 100 includes a vehicle computer 110. The vehicle computer 110 may include one or more devices that together providing various computing functionality to the vehicle. Although not shown in FIG. 1, the vehicle computer 110 may distribute a portion of its functionality to operate remotely via one or more servers. In this respect, the vehicle computer 110 may be networked over a network such as, for example, the Internet, intranets, extranets, wide area networks (WANs), local area networks (LANs), wireless networks, or other suitable networks, etc., or any combination of two or more such networks.

Figure 6:
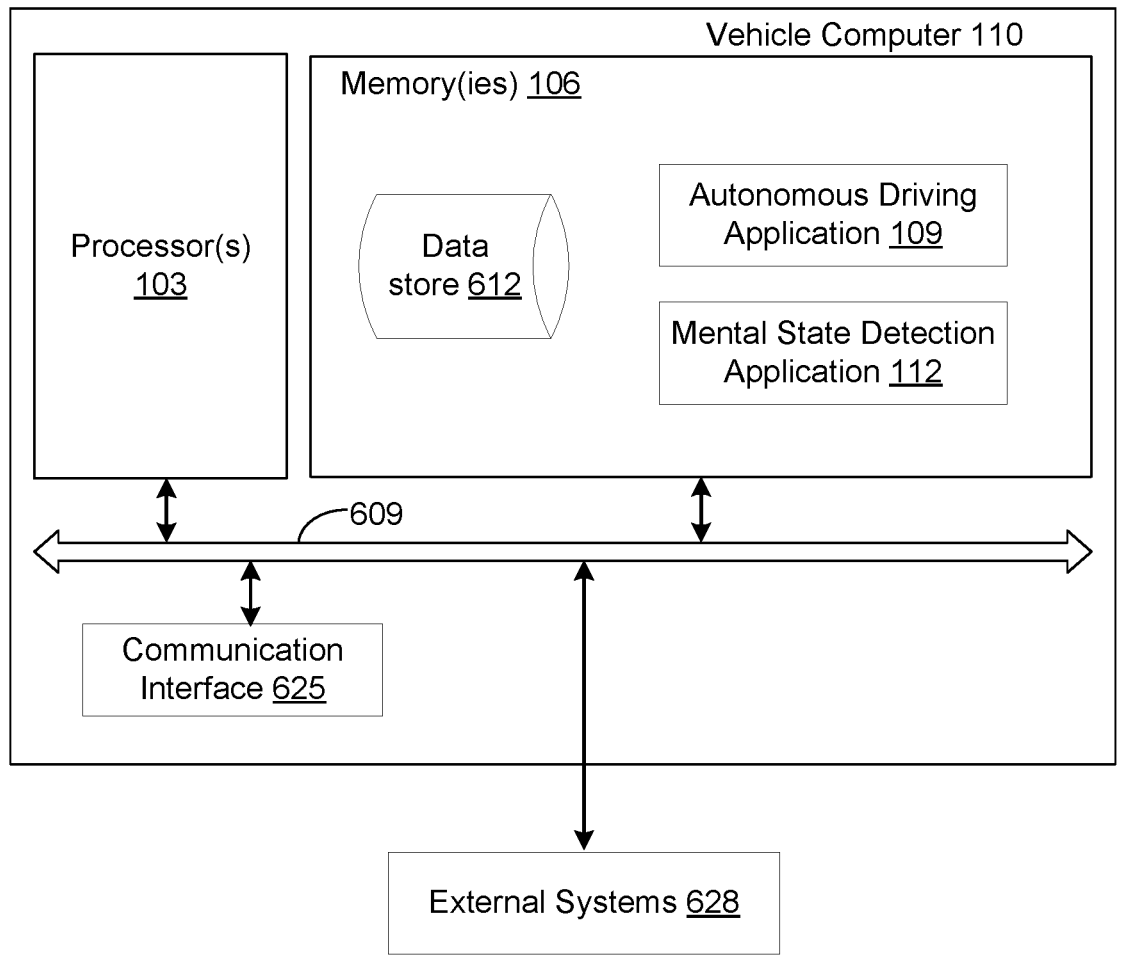
FIG. 6 is a schematic block diagram that provides one example illustration of a vehicle computer according to various embodiments of the present disclosure.

The vehicle computer 110 includes a processor 103 and a memory 106. The processor 103 may include one or more processing cores, processor chips, central processing units, or other processors. The processor 103 is coupled to the memory 106 to execute instructions loaded in the memory 106. The memory 106 may include one or more storage devices, system memory, cache, or other types of memory. The memory 106 is configured to store executable programs, data, or other information used in executing programs loaded in the memory 106. FIG. 6 provides additional details describing embodiments of the vehicle computer 110.

The memory 106 may include an autonomous driving application 109. The autonomous driving application 109 provides autonomous or semi-autonomous driving capabilities to allow the vehicle to automatically drive itself with little to no driver input. The autonomous driving application 109 may include various subroutines such as, for example, lane detection, distance calculations to nearby objects, virtual horizon calculations, video processing, object recognition, and other algorithms to permit autonomous or semi-autonomous driving. The autonomous driving application 109 may interface with various components of the vehicle to allow it to perform vehicle operations such as steering, accelerating, braking, and gear shifting. The autonomous driving application 109 may enter different modes such as, for example, disabled, fully-enabled, or partially-enabled modes. In a disabled mode, the autonomous driving application 109 does not control any vehicle systems such that only the driver is given control to operate the vehicle. In a fully-enabled mode, the autonomous driving application 109 performs all driving functions such as, for example, steering, accelerating, decelerating, shifting gears, etc. In some embodiments, a driver may also provide driver input while autonomous mode is fully enabled. For example, the user may apply the brakes or steer the vehicle while the vehicle is operating autonomously so as to override decisions made by the autonomous driving application 109 as it drives the vehicle. In a partially enabled mode, the autonomous driving application 109 may provide driver assistance in limited circumstances as the user is primarily responsible for operating the vehicle. For example, the autonomous driving application 109 may cause the vehicle to accelerate, decelerate, or turn to avoid detected hazardous road conditions as the user is driving the vehicle.

The memory 106 may also include a mental state detection application 112. The mental state detection application 112 is configured to detect whether the driver's response time to environmental conditions is slow. In other words, the mental state detection application 112 evaluates a driver to determine the driver's reaction time to potential road conditions. In some embodiments, the mental state detection application 112 evaluates the driver during operation of the vehicle. For example, the mental state detection application 112 may determine a road condition where the vehicle should decelerate. If the driver does not respond within threshold period of time, the mental state detection application 112 may record the driver's mental state as a state that requires autonomous vehicle assistance. The mental state detection application 112 may also measure a driver's mental state using one or more test signals to gauge the driver's reaction time. In some embodiments, the test signals are provided while the vehicle is not moving and outside of the vehicle being driven by the driver.

The mental state detection application 112 and the autonomous driving application 109 may be separate applications that interface with one another or may be provided as modules within the same application. In addition, other applications may be executed in the vehicle computer 110 by the processor 103. The memory 106 may also include various data that is stored or loaded. The applications executing in the vehicle computer 110 may read, write, modify, delete, or otherwise manipulate the data stored or loaded in the memory 106. Such data may include, for example, a driver status 115, vehicle configuration settings 118, and potentially other data. The driver status 115 may comprise information indicating the driver's mental state as a result of the driver being monitored by the mental state detection application 112. For example, the driver status 115 may include a status indicating that the driver has a normal alertness level, a medium alertness level, a low alertness level, or any other indicator that expresses the driver's responsiveness to external stimuli. The vehicle configuration settings 118 include parameters and settings for various vehicle components. For example, the sensitivity of the steering wheel, brakes, or acceleration may be recorded as vehicle configuration settings.

The vehicle operating environment 100 may include various systems to control or interface with the vehicle. For example, the vehicle operating environment 100 may include a braking system 130. The braking system 130 may include a pedal system 132, a brake signal generator 136, and a brake subsystem 139. The pedal system 132 receives driver input through mechanical actuation of one or more pedals. The brake signal generator 136 converts mechanical input of an actuated pedal into electrical signals, processes the electrical signals, and generates brake signals. For example, generates a brake signal that tracks the brake input applied to the pedal in a proportional manner.

The brake subsystem 139 may receive the brake signals and cause the vehicle to decelerate according to the brake signals.

To elaborate further, the pedal system 132 may include one or more pedals to control the deceleration of the vehicle. For example, the pedal system 132 may include a brake pedal to apply brake pads to the wheels. The pedal system 132 may also include a single acceleration/deceleration pedal that is separate from the brake pedal. The single acceleration/deceleration pedal may control the vehicle's motor to accelerate the vehicle as well as a regenerative braking system to cause the vehicle to decelerate. When a pedal is actuated, the pedal is displaced from a normal position. The amount of displacement may correspond to a degree of deceleration or braking that should be applied to the vehicle.

The brake signal generator 136 may couple to the pedal system 132 and convert the mechanical actuation of a pedal into an electrical signal (e.g., a data stream) that corresponds to the mechanical actuation. For example, the mechanical actuation may convert the pressure, force, or amount of displacement of a pedal into a stream of corresponding digital values. The brake signal generator 136 may also couple to the vehicle computer 110 and receive control signals from the vehicle computer 110. For example, the autonomous driving application 109 may generate control signals that are received by the brake signal generator 136. The control signals may include instructions of whether to apply brakes and to what degree.

The brake signal generator 136 may convert the control signals received from the vehicle computer 110 or the electrical signals received from the pedal system 132 into brake signals. In this respect, the brake signal generator 136 receives input from the vehicle computer 110 and/or pedal system 132, processes it, and generates brake signals as an output. The brake signals may be an electrical signal, a digital data stream, or any other signal to communicate a manner of causing the vehicle to decelerate. In some embodiments, the brake signal generator 136 may be configured according to the vehicle configuration settings 118. For example, the brake signal generator 136 may process received inputs according to brake sensitivity parameters provided by the vehicle configuration settings 118. The brake sensitivity parameters may include a multiplier or mathematical function to amplify inputs received from a pedal of the pedal system 132.

The brake subsystem 139 receives the brake signal and controls one or more braking components. The braking components include, for example, a hydraulic braking system, a regenerative braking system, a kinetic braking system, an engine-based braking system using a transmission, or a combination thereof. The brake subsystem 139 may comprise brake pads that are applied to the wheels of the vehicle to cause deceleration in the wheel rotation. The brake subsystem 139 may include an anti-lock braking system to prevent brakes from locking under extreme braking conditions. The brake subsystem 139 uses the brake signal to mechanically control one or more braking components such as, for example, brake pads, transmission-based braking components, regenerative braking components, etc.

The vehicle operating environment 100 may also include an acceleration system 145. The acceleration system 145 may include, for example, an engine or motor for causing the wheels of the vehicle to rotate. The acceleration system 145 may include a drivetrain, an internal combustion engine, an electrical motor with zero emission and other electrical or mechanical components to cause the vehicle to accelerate. The acceleration system 145 may also include a transmission configured to operate according to a single gear or a selected gear. The acceleration system 145 may include a pedal to allow a driver to control the vehicle to accelerate. The pedal may be part of both the braking system 130 and acceleration system 145. The acceleration system 145 may convert the pressure, force, or displacement of a pedal into signals that are processed and used to control automotive components responsible for accelerating the vehicle.

In some embodiments, the acceleration system 145 may be controlled by the vehicle computer 110. For example, the vehicle computer 110 may send control instructions to the acceleration system 145 to cause the vehicle to accelerate. In addition, the acceleration system 145 may apply vehicle configuration settings 118 when controlling the vehicle. For example, the vehicle configuration settings 118 may apply rules or limits to the degree of acceleration and/or the speed of the vehicle. For example, the vehicle settings may limit the vehicle's top speed, or may limit the amount a vehicle can accelerate.

The vehicle operating environment 100 may also include a steering system 148. The steering system 148 may include a power steering system, axles, steering column, a rack, one or more joints and other components that make up the vehicle chassis for causing the wheels to turn right and left. The steering system 148 may be controlled by a steering wheel or other input device that allow a driver to steer the vehicle. The steering system 148 may convert the pressure, force, or displacement of the steering wheel or other input device into signals that are processed and used to steer the vehicle.

In some embodiments, the steering system 148 may be controlled by the vehicle computer 110. For example, the vehicle computer 110 may send control instructions to the steering system 148 to cause the vehicle to steer in a specified direction. In addition, the steering system 148 may apply vehicle configuration settings 118 when controlling the vehicle. For example, the vehicle configuration settings 118 may apply parameters such as steering sensitivity.

The vehicle operating environment 100 may also include a sensor system 151. The sensor system 151 may include video cameras, Radio Detection and Ranging (radar), Light Detection and Ranging (lidar), other electromagnetic sensors, and audio sensors. The sensors system 151 may generate sensor data that is provided to the autonomous driving application 109. The sensor data may include raw data indicating the proximity of nearby objects as the vehicle is driven on a road. For example, the sensor data may include a data stream indicating the location or distance that a detected object is relative to a sensor of the sensor system 151. The autonomous driving application 109 may analyze the sensor data to determine a distance of a nearby object as well as the rate or speed in which it is approaching the vehicle relative to the vehicle.

The vehicle operating environment 100 may also include a warning indicator 154. The warning indicator 154 may include an audio and/or visual indicator that serves as an alarm in the event that the autonomous driving application 109 detects a potentially dangerous condition, such as a condition that the vehicle should brake. For example, the warning indicator 154 may be a speaker, a light source, vibrating device, or any other device that projects or emits an output that can be sensed by a driver.

The vehicle operating environment 100 may also include a test system 157. The test system 157 may be used in conjunction with the mental state detection application 112 to detect a driver's mental state. For example, the test system may present, display, emit, project, or create one or more sensory patterns to be observed by a driver. This may include, a light pattern, a sound signal, a vibration, an animation, a sensory sequence, or any combination of the above. The test system 157 may detect the time it takes for a driver to respond to the test signal. The driver may respond by actuating a pedal, turning a steering wheel or provide any other input to operate or control the vehicle. The test system 157 together with the mental state detection application 112 may be used to measure the driver's reaction time. If the driver's reaction time is deemed to be slow, the driver status 115 may be updated to reflect that the driver is slow to respond. If the driver's reaction time is deemed to be normal or above normal, the driver status 115 may be set to a value or status indicating that the driver is alert.

Within the vehicle operating environment 100, the driver status 115 is determined using at least some of the components discussed above. In the event the driver status 115 indicates that the driver has a low level of alertness, the vehicle computer 110 may take various actions to assist the driver or otherwise compensate for the driver's mental state. This is discussed in greater detail with respect to the following figures.

Figure 2A:
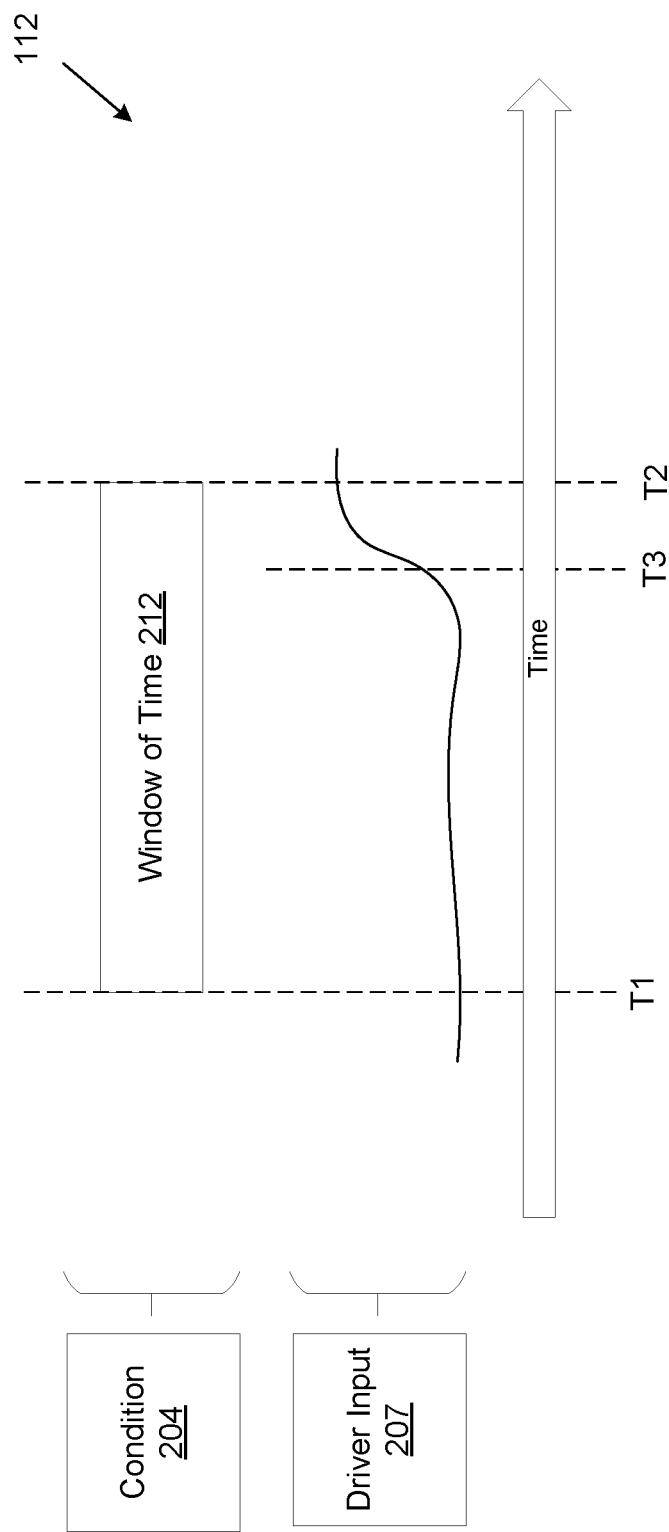
FIGS. 2A and 2B are drawings of examples of detecting a driver status in a vehicle operating environment according to various embodiments of the present disclosure.

FIG. 2A is a drawing of an example of detecting a driver status in a vehicle operating environment according to various embodiments of the present disclosure. FIG. 2A shows an example where a mental state detection application 112 detects that a driver has an alert status. In detecting the driver's status, the mental state detection application 112 may wait for a condition 204 to occur. A condition 204 may be a road condition that is detected to be dangerous. For example, a vehicle computer 110 may analyze sensor data received from a sensor system 151 to determine the presence of an object on the road, the object's relative position to the vehicle, the object's distance from the vehicle, the change in distance over time relative to the vehicle, or a relative acceleration towards the vehicle. This may include a stopped or slow object (e.g., another vehicle, a person, debris on the road, etc.) ahead of the vehicle or along the vehicle's travel path. The condition 204 may be a slippery road condition or other dangerous road condition. The condition may therefore be a condition that occurs during operation of the vehicle that may relate to the safety of the driver. Such conditions may be detected by the autonomous driving application 109 and/or mental state detection application 112 by analyzing sensor data. In some embodiments, a condition 204 is triggered instead of waiting for a condition 204 to occur. Thus, a condition 204 may refer to a test condition or some other condition that occurs while the vehicle is not being operated or while there are potentially no dangerous road conditions. A condition 204 may include a test signal generated by a test system 157 during a safe operating environment.

After the condition 204 occurs or after the condition 204 is triggered, the mental state detection application 112 monitors for driver input 207. Driver input 207 may be the actuation of a pedal that is part of the braking system 130 and/or acceleration system 145. The driver input 207 may be the turning of the steering wheel or any other input provided by the driver to control the vehicle. The driver input 207 may be provided to a vehicle system such as, for example, the braking system 130, acceleration system 145, steering system 148, test system 157, or any other system that receives driver input. These vehicle systems may communicate the driver input 207 to the vehicle computer 110 to allow the mental state detection application 112 to monitor and detect driver input 207.

The driver input 207 may be visualized as a signal where the amplitude corresponds to an input value. For example, if the driver input 207 represents a brake input, then a low input level corresponds to a light actuation of the brake pedal while a large input level corresponds to a stronger or heavier actuating of the brake pedal. In this example, gently tapping the brakes would cause a driver input having low levels while slamming the brakes would correspond to high levels. The amount of, or degree of actuation over time, may be received as the driver input 207.

The mental state detection application 112 may detect whether a driver input is received for a window of time 212 based on the occurrence or triggering of the condition 204. The window of time 212 may be predefined depending on the type of condition 204. For example, if the condition 204 is a braking condition where the vehicle computer 110 determines that brakes should be applied to avoid a detected object on the road, then the mental state detection application 112 detects whether a driver input 207 in the form of a brake pedal actuation is received within a window of time 212 defined for a braking condition. As another example, if the condition 204 is a light pattern presented by a test system 157 to test the user's alertness, then the mental state detection application 112 may monitor for a driver input 207 such as, for example, an input provided at the test system 157, or an actuation of a pedal, steering wheel, or other vehicle input component.

The mental state detection application 112 may also use artificial intelligence or machine learning to evaluate the driver's mental state. For example, driver inputs are analyzed upon the occurrence or triggering of a condition. The driver inputs may be inputs provided by a driver to one or more vehicle control components such as, for example, the braking system 130, the acceleration system 145, the steering system 148. The driver inputs may be supplied to the mental state detection application 112 to evaluate whether the driver is responsive. The mental state detection application 112 analyze the driver inputs along with the timing of the driver inputs to determine a level of alertness of the driver.

In the example of FIG. 2A, a condition 204 occurs or is triggered at time (T1). A window of time 212 is applied beginning at T1 and ending at time (T2). At time (T3) the mental state detection application 112 detects driver input 207. Because driver input 207 was received within the window of time 212, the mental state detection application 112 determines that the driver is alert. The mental state detection application 112 may set the driver status 115 to an alert status.

The driver input 207 may be represented as a signal or data stream indicting the degree or extent that the driver is actuating or manipulating an input component such as a pedal, steering wheel, or other input component. The mental state detection application 112 may evaluate whether the driver input 207 exceeds a threshold amount such as zero or a minimum value to account for noise or to ensure that the driver input is intentional. The mental state detection application 112 may monitor for a specific driver input 207 depending on the type of condition 204. For example, for a braking condition 204, the mental state detection application 112 may monitor for a brake input and/or steering input. In addition, other driver inputs such as for example, an acceleration input, may be disregarded by the mental state detection application 112 with respect to a braking condition 204. Upon receiving the driver input 207, the mental state detection application 112 may evaluate the degree of the brake input and/or steering input against a threshold level to ensure that the driver input was intentional or sufficiently large to infer that the driver intended to respond.

Figure 2B:
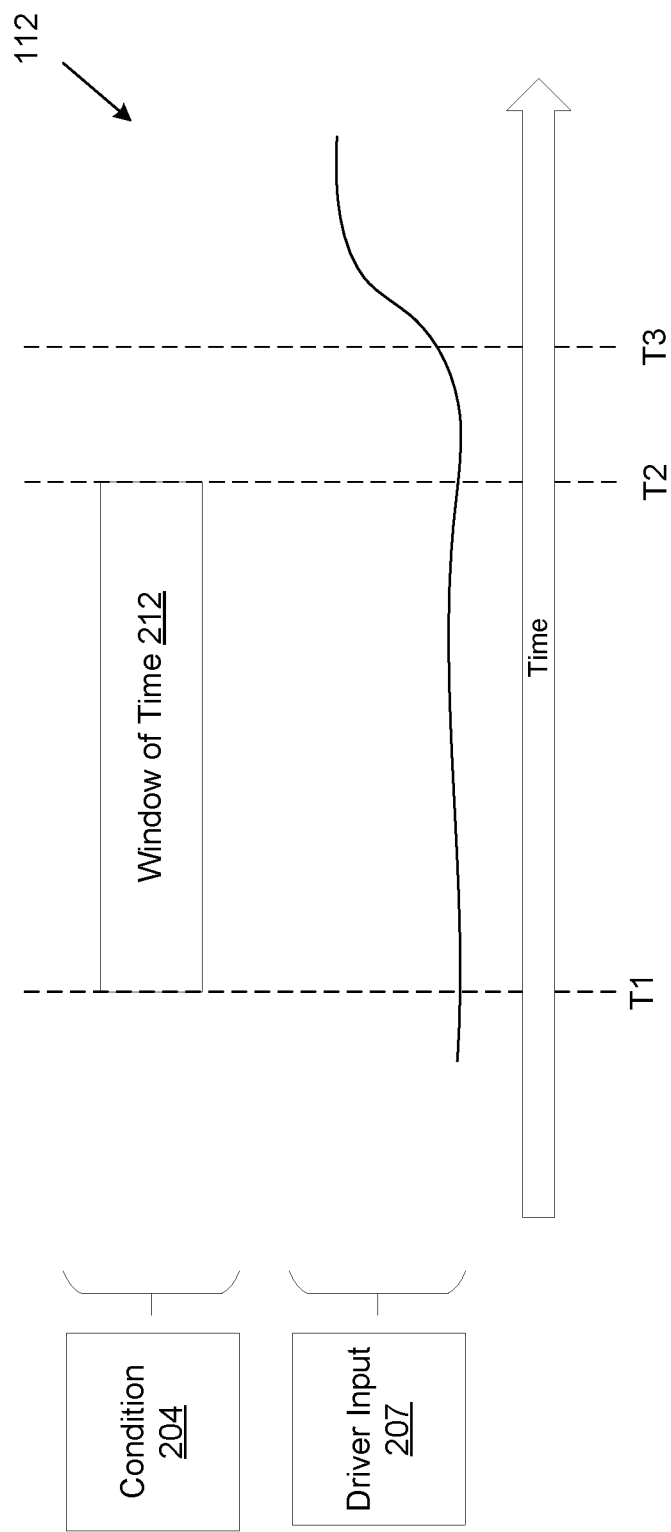

FIG. 2B is a drawing of an example of detecting a driver status in a vehicle operating environment according to various embodiments of the present disclosure. FIG. 2B shows an example where a mental state detection application 112 detects that a driver has a low alertness status. A condition 204 occurs or is triggered at time (T1). The mental state detection application 112 monitors for the presence of a particular driver input 207 to be received within window of time 212 ending at time (T2). No driver input 207 (e.g., no substantial level of driver input 207) is detected until time (T3) outside the window of time 212. The mental state detection application 112 may infer from this that the driver has a low level of alertness and may set the driver status 115 to reflect a low alertness status.

In some embodiments, the driver status may be binary such as a high alertness status or a low alertness status. In other embodiments, the driver status 115 may be a score corresponding to a degree of alertness. The degree of alertness may be based on the difference in time between the moment the condition 204 occurs or is triggered (T1) and the time the driver input 207 is detected (T3).

In some embodiments, an artificial intelligence algorithm may be used to detect the level of alertness of the driver based on the condition, the condition type, the driver input level, and the driver input type. The mental state detection application 112 may use machine learning to determine a driver's level of alertness. For example, the mental state detection application 112 may use supervised learning or unsupervised learning to build a model for detecting the driver's alertness level and setting a corresponding driver status 115. A supervised learning implementation may comprise a classifier that is trained according to training data. The classifier may be used in generating a driver status 115 indicative of the driver's level of alertness. The classifier may be a binary classifier that classifies the condition, the driver inputs, and the timings of the driver inputs to determine whether the driver is or is not alert.

An unsupervised learning implementation may employ a clustering analysis to identify closely related data and/or a neural network to implement pattern recognition in the timing and types of driver inputs in the context of a condition. This may be used to generate a predictive model for predicting the driver's alertness level based on the driver inputs in relation to the condition. The use of machine learning module may allow for the creation of a predictive model based on received user input from a vehicle. As new user input is received, the predictive model may be continuously validated, adjusted, or modified.

FIG. 3 is a drawing of an example of detecting braking conditions in a vehicle operating environment according to various embodiments of the present disclosure. A condition 204, as discussed above with respect to FIGS. 2A and 2B may be a braking condition. A braking condition may be a condition detected by the vehicle computer 110 where brakes may need to be or should be applied to avoid a potentially dangerous road hazard. FIG. 3 provides an example of how the vehicle computer 110 analyzes sensor data 303 to detect one or more braking conditions. The sensor data 303 may be received from one or more sensors of a sensor system 151. The sensor data 303 may indicate the presence, position, and/or distance of nearby objects relative to the sensors installed throughout the vehicle. The vehicle computer 110 may analyze the sensor data to determine the presence of a nearby object, an instantaneous distance between the vehicle and the detected object, the velocity that the detected object is approaching the vehicle relative to the vehicle's frame of reference, other values derived from the position and/or velocity relating to the timing that the detected object could potentially collide with the vehicle.

The vehicle computer 110 may apply one or more braking thresholds to determine whether the sensor data 303 indicates a braking condition. For example, the vehicle computer 110 may apply a soft braking threshold level 305 and a hard braking threshold 309. The soft braking threshold level 305 may be established to detect less sever conditions where brakes should be applied such that a driver has ample time to react to the condition. A braking threshold level 309 may be established to detect more severe conditions where brakes should be applied such that a driver has little time to react to the condition.

The braking threshold levels may be based on, for example, the distance between the vehicle and the detected object (visualized along the x-axis) and the velocity of the detected object relative to the vehicle (visualized along the y-axis). A first braking condition 310 may be when the detected object is close to the vehicle (e.g., short distance away from the vehicle) and when the object is approaching at a sufficiently fast speed towards the vehicle, even at relatively low velocities. This may arise in stop-and-go traffic where neighboring vehicles are close by, velocities are low, and neighboring vehicles may suddenly stop. A second braking condition 311 may be when the detected object is farther away from the vehicle, but when the object is approaching at a sufficiently fast velocity towards the vehicle. This may arise when driving on a high speed freeway and a stalled vehicle appears off in the distance in the middle of the road.

Some situations are considered safe and are not braking conditions 310, 311. For example, in a first situation 312, objects that are somewhat close but velocities are so low may not be deemed braking conditions 310, 311 because the velocities are so low that a driver has time to react. In a second situation 313, a detected object is so far away that the driver has ample time to respond before needing to apply the brakes.

To determine a braking condition such as, for example, the first braking condition 310 or the second braking condition 311, braking threshold levels may be applied. As depicted in FIG. 3, a soft braking threshold level may be a function of distance and velocity relative to the detected object. As the velocity of the detected object (relative to the vehicle) increases or the distance of the detected object (relative to the vehicle) decreases, such conditions fall below the soft braking threshold level 305. In other words, the soft braking threshold level 305 may be visualized in FIG. 3 as a curve such that conditions falling below the curve are considered braking conditions such as, for example, the first braking condition 310 and second braking condition.

Similarly, the hard braking threshold level 309 may also be visualized in FIG. 3 as a curve such that conditions falling below the curve are considered braking conditions such as, for example, the first braking condition 310 and second braking condition. However, the hard braking threshold level 309 may be established to detect more serious braking conditions. For example, in a third situation 314, an object is detected to be at a medium distance approaching at a medium speed. Here, this may be considered a braking condition by applying a software braking threshold level 305 while not considered a braking condition when applying a hard braking threshold level 309.

In some embodiments, the third situation 314 may be used as a condition 204 to detect the driver's mental state and determine an alertness level reflected in the driver status 115. In some embodiments, a warning indicator 154 is configured to present, display, emit, project, or create one or more sensory patterns in response to detecting a braking condition that exceeds a braking threshold level.

Figure 4:
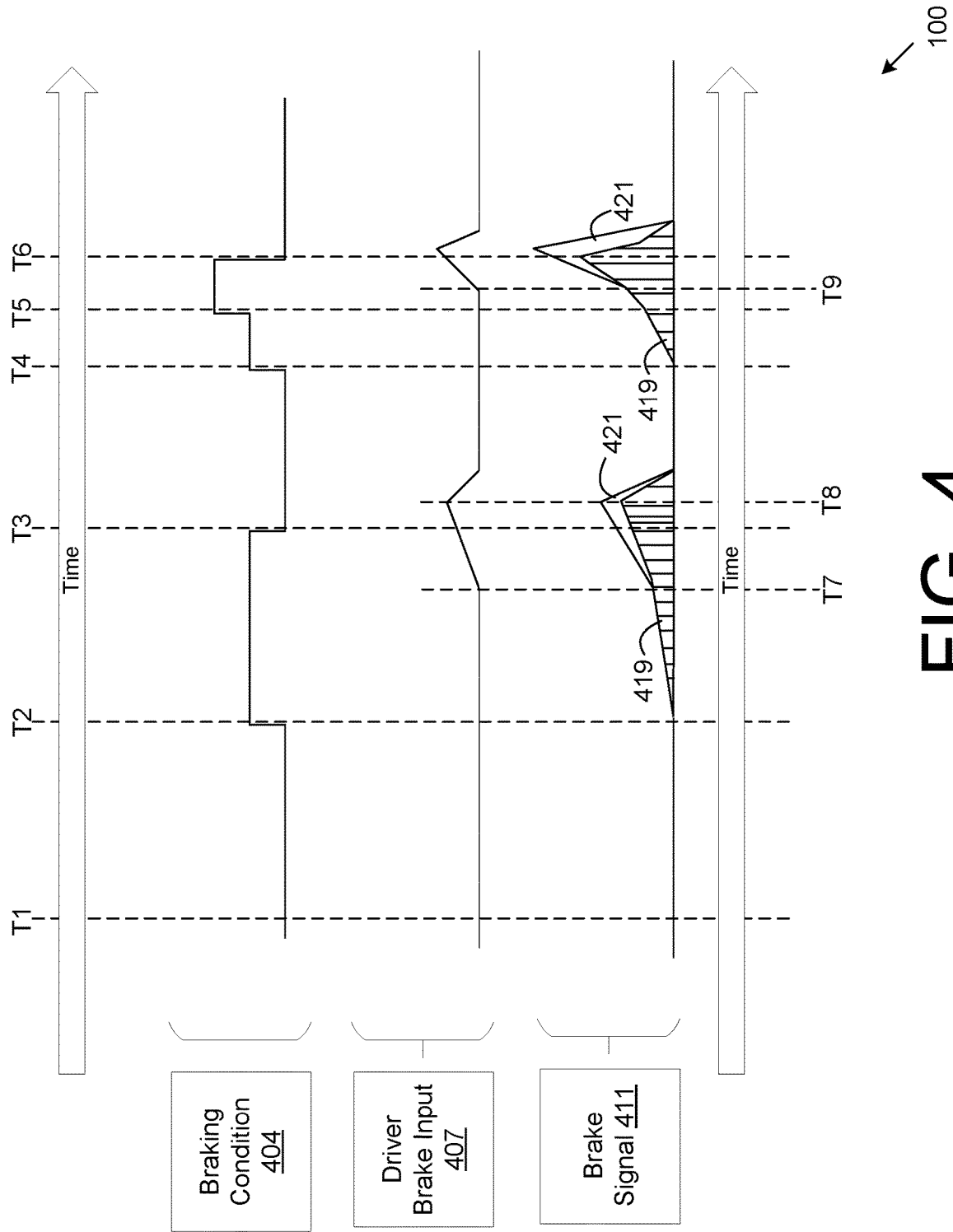
FIG. 4 is a drawing of an example of providing customized vehicle control based on a driver status in a vehicle operating environment according to various embodiments of the present disclosure.

FIG. 4 is a drawing of an example of providing customized vehicle control based on a driver status in a vehicle operating environment according to various embodiments of the present disclosure. Specifically, FIG. 4 illustrates examples where the vehicle computer 110 compensates, adjusts, or otherwise assists a driver who has a driver status 115 corresponding to a low alertness level. As discussed below, the driver status 115 causes the braking system 130 to be updated to perform assisted braking or assisted control in response to detected braking conditions 404. This may include activating an autonomous driving mode that automatically generates brake signals with or without the driver actuating a brake pedal.

For example, the vehicle computer 110 monitors for a braking condition 404. The braking condition may be a software braking condition, hard braking condition, or any other braking condition 404. A soft braking condition may refer to a condition that exceeds a soft braking threshold level (without it exceeding other threshold levels such as a hard braking threshold level) while a hard braking condition may refer to a condition that exceeds a hard braking threshold level. At time (T1), the vehicle computer 110 detects no braking conditions. At time (T2), the vehicle computer 110 detects a software braking condition which persists until time (T3). For example, an object may have been detected to have a potential risk of collision with the vehicle but that risk is no longer present at T3. At time (T4), the vehicle detects a software braking condition. At time (T5), the soft braking condition escalates to a hard braking condition. This may reflect an increasing risk of potential collision at T5. At time (T6), the hard braking condition ceases and no braking conditions are detected.

The vehicle computer 110 monitors for a driver brake input 407. The driver brake input 407 may be generated in response to the driver actuating a pedal of a braking system 130. The driver brake input 407 tracks the degree or level that the driver is controlling the vehicle to decelerate. At time (T7), the driver begins to generate an increasing level of a driver brake input 407. At time (T8), the driver reduces the input level of the driver brake input 407. At time (T9), the driver begins to generate an increasing level of a driver brake input 407. At some time after T6, the driver reduces the input level of the driver brake input 407. Accordingly, FIG. 4 illustrates an example where the driver may apply the brakes or otherwise cause deceleration to the vehicle beginning at T7 and another time beginning at T9.

Next, FIG. 4 depicts a brake signal 411 generated in the vehicle operating environment 100. The brake signal 411 may be generated by the braking system 130. The brake signal 411 may be generated by a brake signal generator 136 of the braking system 130. The brake signal generator 136 may generate the brake signal 411 based on control signals received from the vehicle computer 110 and/or input received by the pedal system 132 as a driver actuates a pedal of the pedal system 132. The brake signal 411 may be generated according to vehicle configuration settings 118 such as, for example, a brake sensitivity parameter.

FIG. 4 shows the generation of brake signal 411 when the driver status 115 indicates that the driver has a low level of alertness. The brake signal 411 may be generated, in part, by an autonomous driving application 109 that automatically generates brake signals without driver assistance and in part, directly by the driver who actuates a pedal. FIG. 4 shows a driver assist portion 419 (depicted in a vertical line fill pattern) and a driver portion 421 (depicted in a solid white fill pattern), each of which contribute to the brake signal 411. The driver assist portion 419 represents a portion of the brake signal 411 that is generated autonomously by the vehicle computer 110 in response to the driver status 115 being a low alert level status. In this example, an autonomous driving mode may be activated to automatically generate at least part of the brake signal 411 in response to braking conditions 404. The driver portion 421 represents a portion of the brake signal 411 that is generated directly by the driver using a manual operation such as, for example, actuating a pedal. In some embodiments, the driver portion 421 is equal to or proportional to the driver brake input 407.

To further explain FIG. 4, at T2, the vehicle computer detects a soft braking condition. According to the driver status 115, the vehicle computer 110 may instruct the braking system 130 to automatically generate a brake signal 411. From T2 to T7, a brake signal 411 is automatically generated without the driver brake input 407. In some embodiments, the brake signal 411 may be generated so that the level increases with time, thereby increasing the rate of deceleration. In other embodiments, the automatically generated brake signal 411 may be generated at a uniform level at a constant deceleration.

From T7 to T8, the driver begins to manually apply the brakes or otherwise provide a driver brake input 407. The braking system 130 may amplify or otherwise increase the signal level to further assist a driver who may be deemed with a low level of alertness. In some embodiments, in response to the driver status 115, the vehicle computer 110 may set a brake sensitivity parameter to increase the effect of deceleration when the driver actuates a brake pedal.

At T4, the vehicle computer may again detect a soft braking condition. The vehicle computer 110 may instruct the braking system 130 to automatically generate a brake signal 411. In addition, at T5, the braking system 130 may amplify or otherwise assist the driver who is applying the brakes and thus providing an increasing driver brake signal 407.

Figure 5:
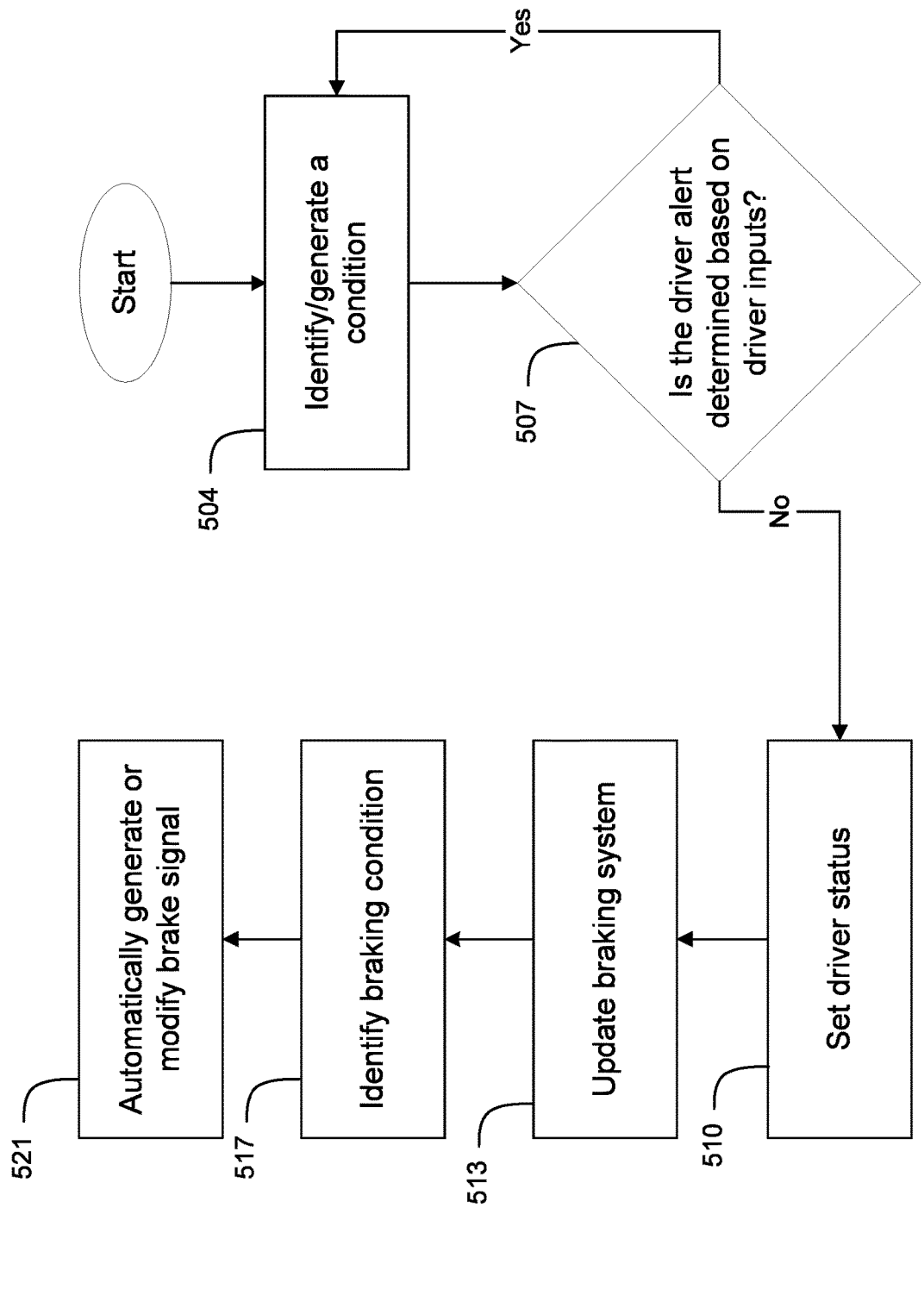
FIG. 5 is a flowchart illustrating an example of the functionality implemented in a vehicle operating environment to detect a driver's mental state according to various embodiments of the present disclosure.

FIG. 5 is a flowchart illustrating an example of the functionality implemented in a vehicle operating environment to detect a driver's mental state according to various embodiments of the present disclosure. FIG. 5 is a flowchart illustrating an example of the functionality implemented by a vehicle computer 110 working in conjunction with other systems (e.g., collectively referred to as a system) according to various embodiments of the present disclosure. For example, the functionality of FIG. 5 may be implemented, at least in part, by a mental state detection application 112. It is understood that the flowchart of FIG. 5 provides merely an example of the many different types of functional arrangements that may be employed by the vehicle computer 110 described herein. The flowchart of FIG. 5 may be viewed as depicting an example of elements of a method 500 implemented in the vehicle computer 110 according to one or more embodiments.

At item 504 the system identifies or otherwise generates a condition. The condition may be a braking condition that is identified based on applying a braking threshold level. For example, sensor data may indicate information about a nearby object and its relative position, velocity, and location with respect to the vehicle. A dangerous or potentially dangerous condition may be determined using the sensor data such as soft braking condition, hard braking condition, or any other condition that requires a driver's attention to respond quickly. The condition may also be identified as part of a test system that triggers or generates conditions to test a user's level of alertness.

At item 507, the system determines the driver's alertness based on driver inputs. For example, in some embodiments, depending on the condition, a vehicle computer may detect whether a particular driver input is received within a window of time to determine whether the driver is responding to the condition. Some conditions may require a driver to respond within seconds to avoid a collision. Thus, the window of time may be in the magnitude of a few seconds. If a driver input is received within a window of time, the system determines that the driver is alert.

In some embodiments, artificial intelligence or machine learning is used to determine the driver's status. For example, when a condition is identified or generated, the driver inputs from one or more vehicle control components (e.g., the braking system 130, the acceleration system 145, the steering system 148) are supplied to the mental state detection application 112 to evaluate the alertness of the driver.

The system may set a driver status accordingly. The system may also identify or generate additional conditions to continue to evaluate the driver's alertness. For example, the flowchart may branch to item 504 to continuously evaluate for the driver's alertness in response to additional identified or generated conditions.

If the driver is considered to have a low level of alertness, then at item 510, the system may set the driver status 115 to a low alertness level. The driver status 115 may indicate whether the driver is alert or has a low level of alertness. In some embodiments, the driver status 115 may be a non-binary score that expresses a degree of alertness. If the driver is considered to have a high level of alertness, the operation proceeds to item 504. At item 504, the system identifies or otherwise generates a condition as described above.

At item 513, the system updates the braking system 130. The braking system 130 may be configured to operate according to the driver status 115. In some embodiments, the configuration of the braking system may be adjusted to automatically generate a brake signal in response to detecting a braking condition using a sensor system. Here, an autonomous driving mode may be activated. For example, upon detecting a soft braking condition, a vehicle computer 110 may generate control signals to cause the braking system 130 to automatically generate brake signals to cause deceleration without driver input. In other embodiments, the braking system 130 may be configured by increasing or decreasing a brake sensitivity parameter. For example, the braking system 130 may be configured according to vehicle configuration settings 118 that include brake sensitivity. In this respect, the braking system 130 amplifies or otherwise assists a driver who is actuating a brake pedal by increasing the overall deceleration effect when the driver status is set to the low alertness status.

At 517, the system identifies a braking condition. The braking condition may be a hard braking condition that requires immediate response. The braking condition may be a soft braking condition that may potentially require immediate deceleration under relatively less severe circumstances.

At 521, the system automatically generates a brake signal or modifies a brake signal. For example, the system may automatically generate a brake signal without any driver assistance or input upon the detecting of a braking condition and when the driver is considered to be in a state of low alertness. The system may also modify a brake signal by amplifying it to further assist the driver in braking.

FIG. 6 is a schematic block diagram that provides one example illustration of a vehicle computer 110 according to various embodiments of the present disclosure. The vehicle computer 110 may include one or more computing devices used to implement the computing functionality of a vehicle. The vehicle computer 110 includes at least one processor circuit, for example, having a processor 103 and memory 106, both of which are coupled to a local interface 609 or bus. The local interface 609 may comprise, for example, a data bus with an accompanying address/control bus or other bus structure as can be appreciated. The vehicle computer 110 may be a computer made up of one or more devices that are installed in a vehicle.

Stored in the memory 106 are both data and several components that are executable by the processor 103. In particular, stored in the memory 106 and executable by the processor 103 are the autonomous driving application 109 and mental state detection application 112. In addition, the memory 106 may include a data store 612 that may store data for carrying out the operations of the vehicle computer 110 and related software applications.

It is understood that there may be other applications that are stored in the memory 106 and are executable by the processor 103 as can be appreciated. Where any component discussed herein is implemented in the form of software, any one of a number of programming languages may be employed, such as, for example, C, C++, C#, Objective-C®, Java®, JavaScript®, Perl®, PHP, Visual Basic®, Python®, Ruby®, or other programming languages.

Several software components are stored in the memory 106 and are executable by the processor 103. In this respect, the term "executable" means a program file that is in a form that may ultimately be run by the processor 103. Examples of executable programs may be, for example, a compiled program that may be translated into machine code in a format that may be loaded into a random access portion of the memory 106 and run by the processor 103, source code that may be expressed in proper format such as object code that is capable of being loaded into a random access portion of the memory 106 and executed by the processor 103, or source code that may be interpreted by another executable program to generate instructions in a random access portion of the memory 106 to be executed by the processor 103, etc. An executable program may be stored in any portion or component of the memory 106 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 106 is defined herein as including both volatile and nonvolatile memory and data storage components. Volatile components are those that do not retain data values upon loss of power. Nonvolatile components are those that retain data upon a loss of power. Thus, the memory 106 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 103 may represent multiple processors 103 and/or multiple processor cores and the memory 106 may represent multiple memories 106 that operate in parallel processing circuits, respectively. In such a case, the local interface 609 may be an appropriate network that facilitates communication between any two of the multiple processors 103, between any processor 103 and any of the memories 106, or between any two of the memories 106, etc. The local interface 609 may couple to additional systems such as the communication interface 625 to coordinate communication with remote systems for distributed computing. The local interface 609 may couple to various external systems 628 such as, for example, a braking system 130, an acceleration system 145, a steering system 148, a sensor system 151, a warning indicator 154, a test system 157.

Although components described herein may be embodied in software or code executed by hardware as discussed above, as an alternative the same may also be embodied in dedicated hardware or a combination of software/general purpose hardware and dedicated hardware. If embodied in dedicated hardware, each may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowchart discussed above shows the functionality and operation of an implementation of components at least partially within a vehicle. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processor in a computer system or other system. The machine code may be converted from the source code, etc. If embodied in hardware, each block may represent a circuit or a number of interconnected circuits to implement the specified logical function(s).

Although the flowchart shows a specific order of execution, it is understood that the order of execution may differ from that which is depicted. For example, the order of execution of two or more boxes may be scrambled relative to the order shown. Also, two or more boxes shown in succession may be executed concurrently or with partial concurrence. Further, in some embodiments, one or more of the boxes may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The components carrying out the operations of the flowchart may also comprise software or code that may be embodied in any non-transitory computer-readable medium for use by or in connection with an instruction execution system such as, for example, a processor in a computer system or other system. In this sense, the logic may comprise, for example, statements including instructions and declarations that may be fetched from the computer-readable medium and executed by the instruction execution system. In the context of the present disclosure, a "computer-readable medium" may be any medium that may contain, store, or maintain the logic or application described herein for use by or in connection with the instruction execution system.

The computer-readable medium may comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including software applications, may be implemented and structured in a variety of ways. For example, one or more applications described may be implemented as modules or components of a single application. Further, one or more applications described herein may be executed in shared or separate computing devices or a combination thereof. Additionally, it is understood that terms such as "application," "service," "system," "module," "engine" and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system comprising:
a sensor system configured to generate sensor data indicating proximity to objects;
a memory that stores program instructions; and
a processor configured to execute the program instructions to cause the processor to:
analyze the sensor data to determine a braking condition based on a first proximity and velocity in relation to an object;
set a driver status based on a machine learning model using a classifier that is trained according to training data, wherein the classifier classifies the braking condition, driver inputs, and timings of the driver inputs to determine whether a driver is alert; and
update a braking system according to the driver status, wherein the braking system is configured to generate brake signals to cause a vehicle to decelerate, the braking system comprising a pedal configured to receive a driver brake input.

2. The system of claim 1, the driver status is set to a low alertness status in response to the driver brake input not being received within a predetermined window of time following the braking condition.

3. The system of claim 2, wherein the processor is configured to update the braking system by increasing a brake sensitivity parameter according to the driver status being set to the low alertness status.

4. The system of claim 2, wherein the processor is configured to update the braking system by activating an autonomous driving mode according to the low alertness status, wherein the autonomous driving mode is configured to generate a brake signal in response to the sensor data indicating that at least the first proximity exceeds a threshold level.

5. The system of claim 1, wherein the braking system is configured to generate at least some brake signals proportional to the driver brake input.

6. The system of claim 5, wherein the braking system is configured to generate at least some brake signals using an autonomous driving system.

7. The system of claim 1, further comprising an audio or visual indicator configured to be activated in response to the braking condition.

8. A system comprising:
an interface to a braking system, the braking system being configured to generate brake signals to cause a vehicle to decelerate, the braking system comprising a pedal configured to generate at least some of the brake signals;
a memory that stores program instructions; and
a processor configured to execute the program instructions to cause the processor to:
determine a level of driver alertness by analyzing at least one driver input in response to at least one condition, wherein the level of driver alertness is recorded as a driver status and wherein the condition is generated by a test system configured to measure driver reaction time; and
adjust a configuration of the braking system according to the driver status, wherein determining the level of driver alertness comprises determining the level of driver alertness via a machine learning model using a classifier that is trained according to training data, wherein the classifier classifies the condition, the driver input, and timings of the driver input to determine whether a driver is alert.

9. The system of claim 8, wherein the condition comprises a braking condition based on a proximity to an object.

10. The system of claim 9, further comprising an audio or visual indicator configured to be activated in response to the braking condition.

11. The system of claim 8, wherein the condition comprises a braking condition, and the configuration of the braking system is adjusted to automatically generate a brake signal in response to detecting the braking condition using a sensor system.

12. The system of claim 8, wherein the condition comprises a visual indicator, and wherein the driver input comprises a driver brake input.

13. The system of claim 8, further comprising a sensor system configured to generate sensor data indicating a proximity to objects.

14. A computer-implemented method comprising:
sensing, by a sensor system, proximity to an object and a velocity in relation to the object;
determining at least one condition based on the proximity and the velocity;
detecting, by a processor, whether a driver provides a driver input within a predetermined window of time following the condition;
setting, by the processor, a driver status based on a machine learning model using a classifier that is trained according to training data, wherein the classifier classifies the condition, the driver input, and timing of the driver input to determine whether the driver is alert; and
activating an autonomous driving mode, by the processor, according to the driver status, wherein the autonomous driving mode is configured to generate a brake signal in response to sensor data indicating that at least the proximity to the object exceeds a threshold level.

15. The method of claim 14, wherein the condition comprises a braking condition based on the sensor data, and wherein a pedal of a braking system is configured to receive the driver input.

16. The method of claim 15, wherein the brake signal is a first brake signal, the method further comprising automatically generating a second brake signal in response to the driver input not being received within the predetermined window of time following the braking condition.

17. The method of claim 15, further comprising activating an audio or visual indicator in response to the braking condition.

18. The method of claim 14, wherein the condition comprises a visual indicator, and wherein the driver input comprises an actuation of a brake pedal of a braking system.

19. The method of claim 14, wherein the driver status is further based on whether the driver input is received within the predetermined window of time.

* * * * *